United States Patent [19]
Bertolotti

[11] Patent Number: 5,249,745
[45] Date of Patent: Oct. 5, 1993

[54] FLUID DISTRIBUTION SYSTEM

[76] Inventor: Giacomo Bertolotti, P.O. Box 2247, Lynchburg, Va. 24501

[21] Appl. No.: 762,354

[22] Filed: Sep. 19, 1991

[51] Int. Cl.$^5$ .............................................. B05B 1/08
[52] U.S. Cl. ........................................ 239/76; 239/99; 239/101; 137/624.14; 251/57; 251/47; 251/54
[58] Field of Search ...................... 239/99, 101, 76, 67; 137/624.14; 251/28, 57, 49, 54

[56] References Cited

U.S. PATENT DOCUMENTS

| | | | |
|---|---|---|---|
| 3,080,881 | 3/1963 | Stilwell et al. | 137/624.14 |
| 4,176,791 | 12/1979 | Cattaneo et al. | 239/99 |
| 4,244,555 | 1/1981 | Maggioni et al. | 251/82 |
| 4,246,921 | 1/1981 | Beccaria et al. | 137/624.14 |
| 4,269,224 | 5/1981 | Dotti et al. | 137/596.15 |
| 4,365,644 | 12/1982 | Maggioni | 137/614.11 X |
| 4,367,765 | 1/1983 | Moretti et al. | 137/596.12 X |
| 4,376,453 | 3/1983 | Moretti et al. | 137/625.64 |
| 4,501,406 | 2/1985 | Walther et al. | 251/29.06 |
| 4,515,175 | 5/1985 | Nolting et al. | 137/107 |
| 4,531,707 | 7/1985 | Dotti et al. | 251/44 |
| 4,781,217 | 11/1988 | Rosenberg | 137/624.14 |
| 4,900,189 | 2/1990 | Barosso et al. | 137/624.14 |

FOREIGN PATENT DOCUMENTS 1036305 8/1983 U.S.S.R. .................. 239/76

Primary Examiner—Andres Kashnikow
Assistant Examiner—Lesley D. Morris
Attorney, Agent, or Firm—Morgan & Finnegan

[57] ABSTRACT

The illustrative embodiments of the invention described comprise systems for pulse distribution of irrigating fluid. The systems described include a header that feeds at least one irrigating line in which an array of emitter valves are connected in series to a header. Elastic tubes between each of the emitter valves serve as reservoirs for the irrigating fluid between pulses. A pulser connects the irrrigating fluid conduit to the header in response to activation from a pilot valve. An optional accumulator bellows that is joined to the header collects surplus irrigating fluid and returns it to the system at the appropriate time in the pulse cycle. The pilot valve, moreover, responds to pressure fluctuations by activating and deactvating the pulser. An adjustable spring biased variable capacitance chamber and a fluid diode, moreover, that are coupled to the pilot valve combine to determine the irrigation pulse repetition rate.

10 Claims, 8 Drawing Sheets

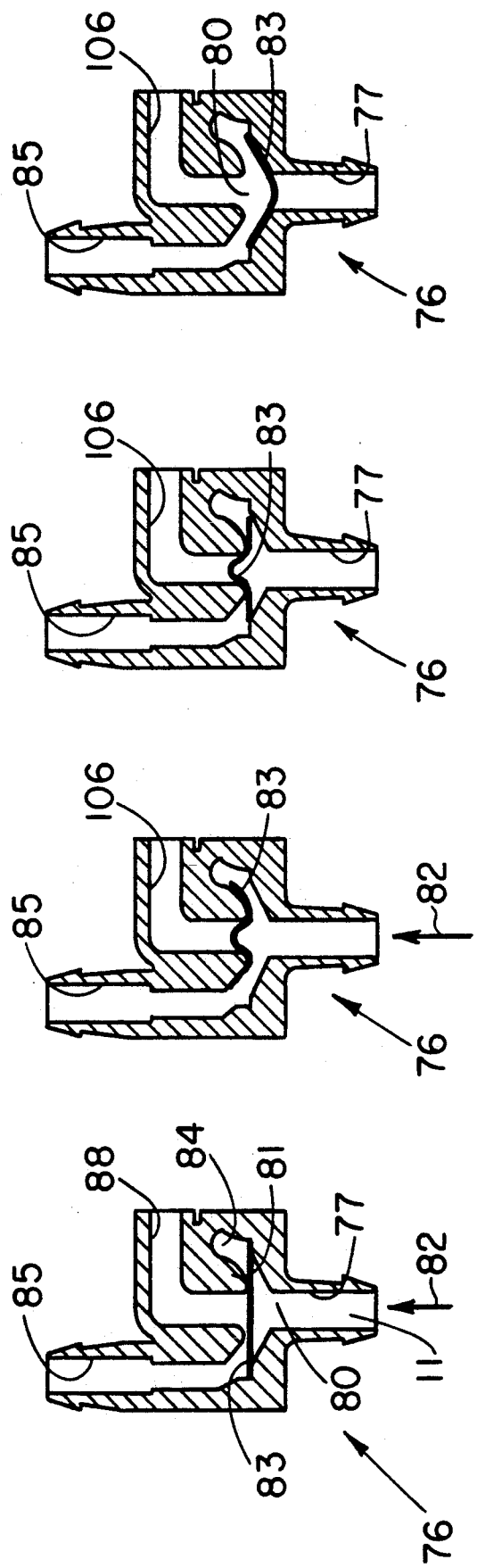

FLUID DISTRIBUTION SYSTEM

BACKGROUND OF THE INVENTION

This invention relates to methods and apparatus for fluid distribution systems and, more particularly, to an improved pulse irrigation system that is more adaptable to varied needs and which, more uniformly, distributes irrigating fluids with reduced fluid wastage.

There is an unquestionable need for better irrigation systems than those which are generally available to the industry. For example, a typical system has a manifold that is coupled to a water supply. Each line is connected to the manifold through a respective pilot valve. Each of these lines comprises a set of elastic tubes, each of the tubes being joined to the next tube in the series through a combination diaphragm valve and discharge nozzle. The elastic tubes expand slightly under hydraulic pressure as they fill with irrigating water until the pressure at the end of the line approaches the supply pressure. When that pressure is reached, a pilot valve trips to stop the filling and cause the individual diaphragm valves to block the passageways to the manifold and open passageways to the discharge nozzles in each of the diaphragm valves. The irrigating water is sprayed from the nozzles and, when the water stored under pressure in the communicating elastic tubes is sufficiently depleted, the diaphragms in each of the valves shift position in response to the header pressure to block any further flow from the discharge nozzles and permit the elastic tubes to fill once more in order to repeat the cycle.

This closed loop system, however, has a number of serious deficiencies. The inherent limitations of this system, for example, prevent its application to larger installations. A ten acre orchard, for instance, would require forty or fifty irrigating loops because the time needed to fill each loop limits the number of emitters that can be inserted in a loop to forty or fifty emitters. Operation of each of these loops also must be synchronized which is a burdensome task. Further, the proliferation of these loops aggravates the problem of wasted pilot valve discharge water. The quantity of fluid discharged from each nozzle and uneven pressure distribution at these nozzles in these systems, moreover, varies and thus fail to supply uniform charges of irrigating water. This problem of providing uniform charges of irrigating fluid is made even more difficult when the system is installed in hilly terrain, in which the static pressure head changes depending on the relative elevation of the line. This variation in discharge makes the system almost impossible to use for distributing chemicals with the irrigating water because of the non-uniform nature of the quantity of fertilizers, herbicides and the like that are discharged through the nozzles. These discharge nozzles also have very small passageways and thick relatively inflexible diaphragms that tend to clog with entrained particulate matter and produce increased flow resistance, even when unclogged.

Further in this regard, the use of interconnecting elastic tubes as fluid reservoirs is quite inadequate. The elastic deformation of these tubes, and hence the water volume accumulated in each cycle, is limited to some value that is less than the force required to rupture the coupling between each end of the elastic tube and the fittings on the valves to which these tubes ends are connected. This limit on tube deformation imposes a small storage volume which requires only a short filling time, the result of which is an undesirably rapid operating cycle with low discharge volume. These high cycle rates are not acceptable in many applications and aggravate the pilot valve waste water problem.

Pilot valves, which initiate irrigating flow through the discharge nozzles, discharge into the atmosphere and, as a consequence, are responsible for a loss of water in the valve vicinity. Not only does this characteristic waste valuable water because the water is discharged in a place that cannot use it for irrigation purposes, but it also produces potentially more serious effects. For example, the pilot valve wastage usually is dispersed underground. This dispersion requires additional pumping power and water; a sub-soil dispersion system to avoid soil saturation and water ponding; and it concentrates herbicides, fertilizers and the like at the dispersion sites.

As a further deficiency, systems of this nature require a uniform number of discharge nozzles and associated diaphragm valves in each line loop. This requirement produces an irrigation system that can be used only in farms and orchards with an essentially rectangular shape. Acreage, however, freqently comes in irregular shapes. There are other, very practical considerations that have detracted from the value and utility of prior art apparatus. Illustratively, for ground installed emitters in fruit orchards, the upwardly protruding plastic nozzle on some designs frequently is stepped on and broken by laborers. These emitters also must be drained of water before cold weather occurs, a laborious task, or ice formation within the emitters will break the valves.

There are some proposed systems in which the irrigation lines are not closed loops but are, instead, a sequence of ducts and valves that form a linear network. Proposals for these systems, however, are not entirely satisfactory because the valves not having a self-cleaning action, are vulnerable to clogging and stoppages from dirt and other particulate matter entrained in the irrigating fluid. Further in this regard, these arrangements limit the number of parallel lines that can be serviced in a particular system and increase the volume of irrigating fluid that is wasted through discharge to the atmosphere with each pulse from the pilot valve. There is even an additional source of waste water during transition from one valve position to another because the inlet and discharge ports both remain open when the valve is in transition.

Thus, there is a need for an improved irrigation method and apparatus that provides a uniform pressure distribution and volume of irrigating fluid discharge from each nozzle; a more acceptable cycle rate; greater fluid storage volume in the elastic tubes between the diaphragm valves and discharge nozzle combinations in which the elasticity is selected to satisfy emitter flow requirements rather than being limited to the gripping force needed to keep the tube secured to the adjacent emitters; a pulser valve that does not waste irrigating water and a system of irrigating lines that do not require the same number of nozzles in each line but can be varied in number and in length to match the irrigation system to the shape of the acreage that is being cultivated. There are, of course, the further needs to avoid particulate matter clogging and vulnerability to damage not only through field abuse, but also from ice formation.

SUMMARY OF THE INVENTION

These and other deficiencies that have characterized the prior art overcome, to a great extent, through the practice of the invention. Illustratively, the pulser valve that connects the water supply to the header has an inlet port that, although opened at the beginning of the filling phase of the pulse irrigation cycle, closes when filling is terminated and remains closed during the entire discharge phase. The discharge port opens to depressurize the header and permit irrigating water to be ejected only after the inlet port is closed. This pulser discharge port also closes before the inlet port reopens and the discharge port remains closed during the following filling phase. The fluid discharged by the header during header depressurization is reduced to a minimum, in accordance with an optional feature of the invention, through flow into an expansible accumulator where it is stored until the discharge phase is complete. After discharge is complete, this fluid in the accumulator then flows back into the header.

The tube material for the header and the tubing that joins each of the lines of irrigation water discharge nozzles to the header is made of a relatively rigid material with very low elasticity to minimize the volume of water that is involved in depressurization.

Except for the emitter valves that are coupled to the rigid tubes which join each of the respective irrigating lines to the header, the emitter valves are connected at their respective inlets and outlets to sections of elastic tubing. In accordance with a further feature of the invention, the elasticity of these tubing sections is selected to satisfy the flow requirements of the emitter and are essentially independent of the inherent gripping force required to seize the tube on the emitter valve nipple. This feature of the invention is provided, in one embodiment of the invention, through a clamp formed from a rigid tube that has an inside diameter equal to the outside diameter of the tube within. The clamp is slipped over the tube and emitter valve nipple, which nipple has a corresponding annular flange that compresses the adjacent portion of the tube between the nipple and the clamp.

One end of a control tube of very small diameter and low elasticity (to reduce irrigating water wastage to a minimum and to improve the speed of pressure wave travel through the tube) is connected at one end to a section of elastic tube between two emitter valves in the longest line of a module. The other end of the control tube is coupled to a diaphragm chamber in a pilot valve. The pilot valve uses supply water pressure to regulate the operation of the pulser valve, the pressure in the control tube opening and closing the passageway between the water supply and a diaphragm chamber in the pulser valve to cause the pulser valve to fill the header or depressurize the header to initiate the irrigation water discharge phase.

This particular feature of the invention makes it very easy to change the frequency of the irrigation cycle and to synchronize the operation of several irrigation modules in a particular installation. To decrease the pulse rate, the control tube is shifted to an elastic tube that is closer to the end of the line. An increase in pulse frequency is achieved by moving the point of fluid communication to an elastic tube that is closer to the header.

In another embodiment of the invention, however, the pulse frequency is not determined by the position of the control tube relative the end of the irrigation line to which it is attached. This second embodiment of the invention has on the pilot valve a fluid diode, or delay, and a spring-biased rolling diaphragm that combine to control the irrigation pulse frequency. This combination of features on the pilot valve that control the irrigation pulse frequency thus avoids the laborious task of shifting the position of one end of the control tube relative to the end of an irrigating line to adjust this frequency, but enables the farmer to regulate the frequency through a simple manipulation of the spring biasing for the rolling diaphragm.

Note also in this regard that the irrigation lines are not loops, with a limited number of emitter valves, but are, instead, individual lines that terminate with the last segment of elastic tube, the end of which is sealed. In this manner, up to one thousand emitters can be operated in a single module and the length of each of the lines in a module can be varied to match the irregular shape of a tract of land that is to be irrigated. Installation in hilly terrain, moreover, does not introduce variations in emitter discharge volumes as a consequence of static pressure head differences.

To operate the pilot valve, some limited quantity of the irrigating fluid in the pulser diaphragm chamber is discharged to the atmosphere. The volume that is lost, however, is indeed minor in comparison with the discharge from the header during depressurization that has characterized the prior art.

The emitter valves each have a flexible diaphragm which, in its normal relaxed condition, blocks flow through the discharge nozzle. In this condition the diaphragm permits irrigating water to flow from the header through each of the lines, swelling the elastic tubes which act as pressurizing reservoirs.

The emitter nozzles, moreover, may have larger passageways to reduce the possibility of clogging and also may have diaphragms that flex but do not stretch under pressure in order to reduce flow resistance, and thus reduce filling time, as well as to provide a self-cleaning action for the nozzle as the diaphragm flexes and presses against the adjacent nozzle surfaces. The wall thickness, shape and elastic properties of the emitter nozzle, furthermore, can be so combined that the stresses created by ice are below the ultimate tensile strength of the nozzle, thereby eliminating the need to drain the emitters before the onset of freezing weather.

The pressure throughout the lines in the module thus approach the fluid pressure in the header. This maximum filling pressure in the control line forces the pilot valve to close the passageway from the water supply to the diaphragm chamber of the pulser valve. The pulser valve, in response, closes the inlet between the water supply and the header and opens a discharge passageway between the header and the accumulator to permit the pressure in the header, and throughout the lines to decrease. The decrease in upstream pressure relative to pressure in the elastic tubes shifts the diaphragm in each emitter valve against the diaphragm's inherent elastic forces to a position in which a passageway is open for fluid under pressure to flow from the downstream elastic tube out of the emitter through the discharge nozzles. There is a brief interval of time in which the passageway from the header through the line also is open, but the pressure differences and the elasticity of the diaphragm force the diaphragms in the emitter valves to block the passageway to the header.

When the elastic tubes have depleted their elastic forces in expelling the contained water, the pressure in the control tube also declines, once more opening the flow through the pilot valve between the water supply and the diaphragm chambers in the pulser valve. The pulser valve then opens a passageway that enables fluid stored in the accumulator to flow back into the header for eventual use as irrigating water. Subsequently, the inlet in the pulser valve opens to enable water to flow from the supply, back into the header and into the individual lines in which the emitter valve diaphragms are once more restored through the natural resiliency of the respective diaphragms to block flow through the associated discharge nozzles and in which the passageway from the header to the elastic tube segments is once more open and the passageway from the segments to the respective discharge nozzles are closed. Thus, the fill phase of the cycle begins again.

Consequently, the features of this invention overcome many of the inadequacies of the prior art. Accordingly, the invention is best understood through reference to the following detailed description of a specific embodiment of the invention, when taken in conjunction with the figures of the drawing. The scope of the invention, however, is limited only through the claims appended hereto.

BRIEF DESCRIPTION OF THE DRAWING

FIG. 11 is another embodiment of an emitter valve that characterizes the invention, with the valve in a no flow status;

FIG. 12 is a schematic diagram of the emitter valve shown in FIG. 11 with the valve in a discharge status;

FIG. 13 is a schematic diagram of the emitter valve shown in FIG. 11 with the valve at an end of filling status;

FIG. 14 is a schematic diagram of the emitter valve shown in FIG. 11 with the valve in a filling status;

DETAILED DESCRIPTION OF THE INVENTION

Figure 1:
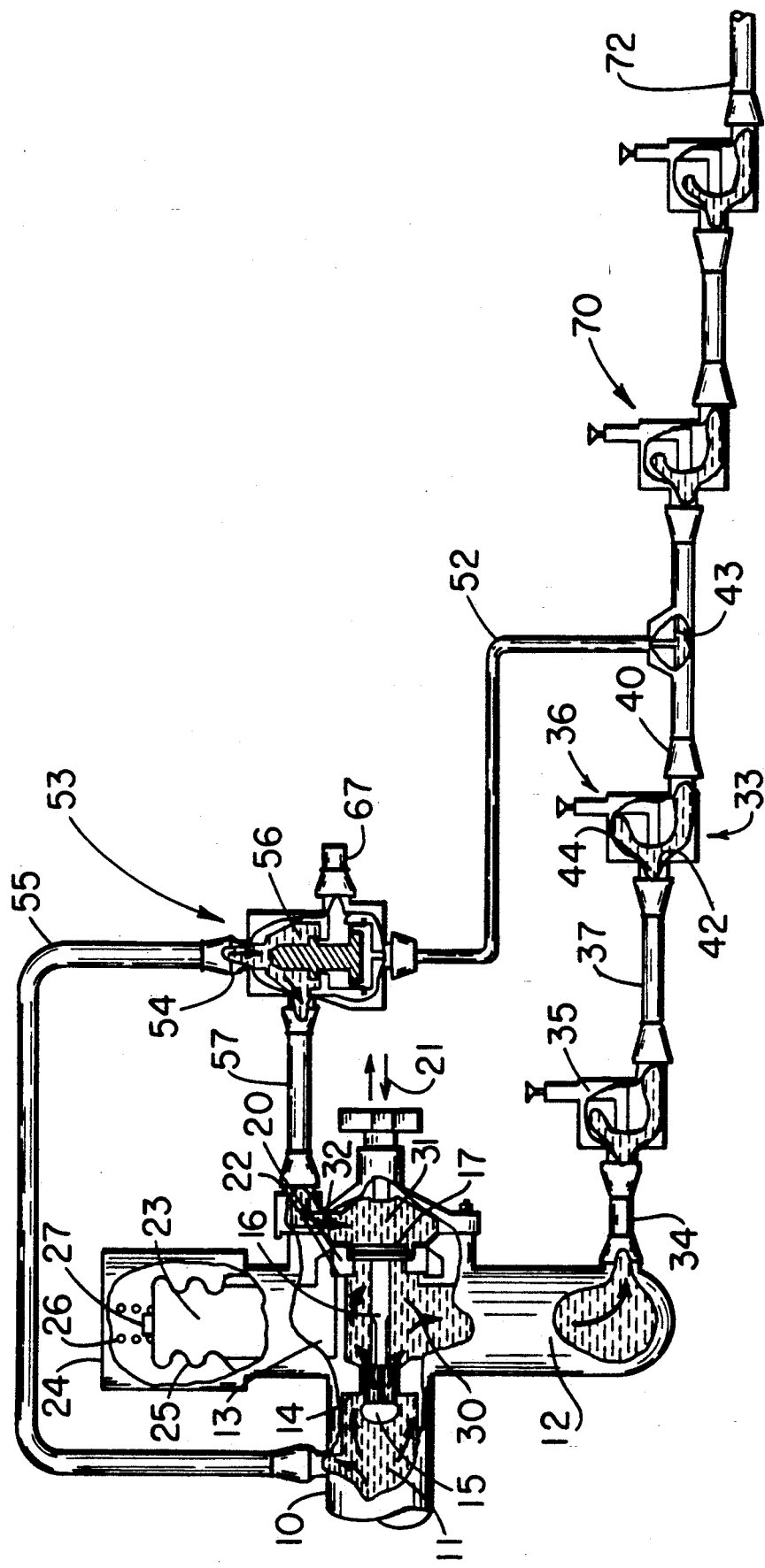
FIG. 1 is a schematic diagram of a specific embodiment of the invention.

For a more complete understanding of a specific embodiment of the invention, attention is invited to FIG. 1 which shows a conduit 10 with a supply of irrigating fluid 11. According to the system that characterizes the invention, the irrigating fluid need not be filtered, or otherwise purified and it can also contain herbicides, fungicides, fertilizers and other suitable chemicals for distribution through the irrigating fluid. The irrigating fluid 11 communicates with an header 12 through the operation of a pulser 13.

The pulser 13 has an inlet port 14 that is opened and closed through the operation of an inlet port plug 15. The inlet port plug is attached to and controlled by the transverse movement of a valve stem 16 which has, on the end opposite to the inlet port plug 15, a pulser diaphragm 17 and an annular discharge port plug 20 that is secured to the periphery of the pulser diaphragm. As shown best in FIG. 1, the discharge port plug 20 moves transversely in the directions of arrows 21 under the control of the pulser diaphragm 17 to close a discharge port 22 and then to open the inlet port 14 in order to selectively establish fluid communication between the header 12 and an accumulator 23. Illustratively, the accumulator 23, which can be incorporated in the system as an optional device, comprises a housing 24 that encloses a fluid tight bellows 25 which is in fluid communication with the header 12 through the discharge port 22. A coil spring 26, is mounted between the transverse end of the bellows 25 and the parallel inner surface of the housing 24 by means of a spring keeper 27.

Turning once more to the pulser diaphragm 17, it can be seen that the pulser diaphragm divides the pulser into two chambers, a header chamber 30 and a pulser diaphragm chamber 31. Also as shown in FIG. 1, the diaphragm chamber 31 has a control tube inlet 32.

In accordance with a characteristic feature of the invention, the header 12 is made of a relatively hard, stiff and inelastic material, of which polyvinyl chloride has been found most practical because it has a relatively high modulus of elasticity. An irrigating line 33 is shown for illustrative purposes. As mentioned above, a group of irrigating lines, of which the line 33 is only exemplary, can be coupled in parallel in fluid communication with the header 12. The lengths of these lines, in contrast to the prior art, each may be different from all of the others in order to adapt the irrigation field to irregular farm or orchard field dimensions. Connected to the header 12, also in accordance with a feature of the invention, is a rigid tube segment 34, also formed from a hard, stiff and inelastic material, of which high-density polyethylene, when used in pipes with a high-dimension ratio (i.e., wall thickness to diameter) is typical. Additives, moreover, can be added to the polyethylene to provide resistance to environmental stress cracks. As earlier mentioned, the particular benefit provided through the rigid header 12 and tube segment 34 being the limitation or restriction it imposes on the volume of the irrigating fluid 11 that must be depressurized, as described subseqently in more detail.

Figure 6:
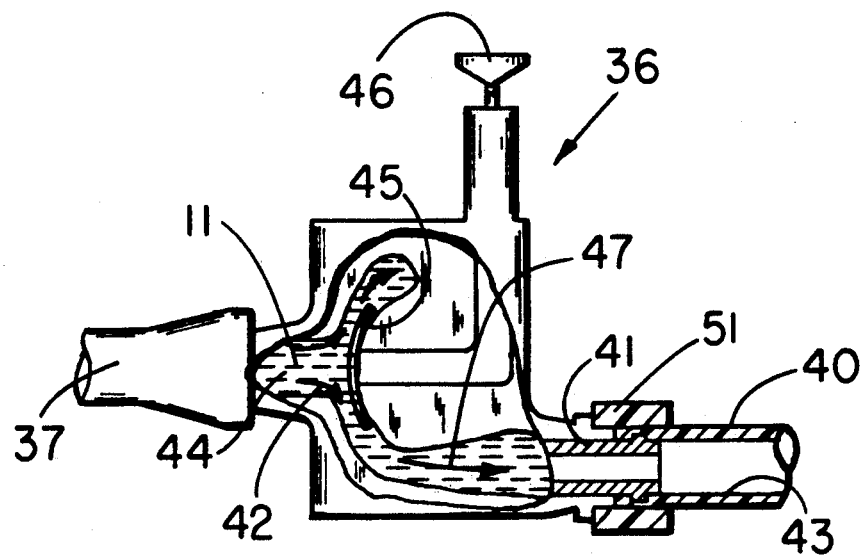
FIG. 6 is a schematic diagram of the emitter valve, in partial section, as shown in FIG. 1, in the filling phase.

An emitter valve 35 is coupled to the end of the rigid tube segment 34 that is opposite to the end that is joined to the header 12. For a more detailed appreciation of the principles and advantages of the emitter valve 35, attention is invited to FIG. 6 which shows a typical emitter valve 36 which is in fluid communication with an elastic tube 37 that establishes a passageway through the line 33 (FIG. 1) to the header 12. Another elastic tube 40 (FIG. 6) is coupled to a downstream nipple 41 on the emitter valve 36. The elastic tubes 40 and 37 are, preferably, made from olefin polymers or from a compound of polyethylene copolymers, linear low-density polyethylene and additives to prevent environmental stress crack resistance in order to provide the resiliency and elastic forces that are required to store irrigating fluid under pressure, in accordance with another feature of the invention.

Figure 7:
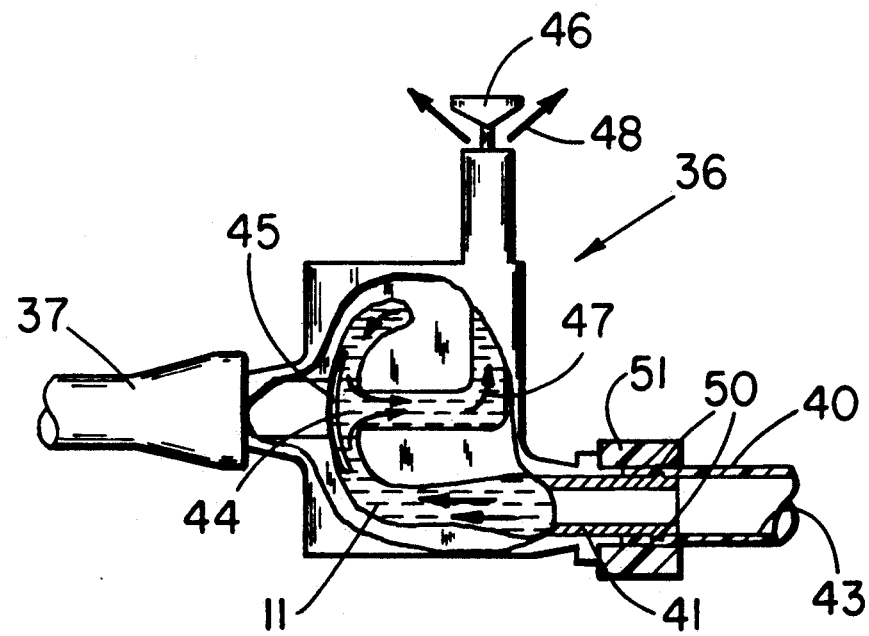
FIG. 7 is a schematic diagram of the emitter valve, in partial section, as shown in FIG. 6, but with the emitter valve in the discharge phase.

Returning to the emitter valve 36, an inlet passageway establishes fluid communication with reservoir 43 within the elastic tube 40 through throat 44 (FIG. 7) that is opened and closed in response to the inherent resiliency of a rubber diaphragm 45. In the embodiment of the invention shown in FIG. 6, the rubber diaphragm is, preferably, made of a silicone elastomer. The diaphragm 45 is mounted in the throat 44 to enable the diaphragm to shift from the position shown in FIG. 6 in which the diaphragm is in a relaxed, unstressed condition that establishes communication for the irrigating fluid 11 from the elastic tube 37 to the reservoir 43 within the elastic tube 40 while, at the same time, blocking all irrigating fluid flow through emitter discharge passageway 47 to emitter discharge nozzle 46.

As described subsequently in further detail, the combination of pressure differences between the irrigating fluid in the elastic tube 37 (FIG. 7) and the reservoir 43, when taken with the elastic forces in the rubber diaphragm 45, causes the diaphragm to shift its position to establish irrigating fluid communication from the reservoir 43 through the emitter discharge passageway 47 and, under the stored resilient forces in the elastic tube 40, out through the discharge nozzle 46 as shown through arrows 48. A specific feature of the invention is shown in connection with the downstream nipple 41. As illustrated, the nipple 41 has an outwardly protruding annulus 50 that bears against the immediately adjacent portion of the elastic tube 40, distorting the shape of that part of the tube. To prevent the pressure of the irrigating fluid 11 within the emitter valve 36 from overcoming the friction force imposed on the elastic tube 40 and thereby separating the tube from the nipple 41, in accordance with the invention, a clamp 51 presses the tube 40 to the annulus 50 on the nipple, thus significantly increasing the pressure that can be accumulated within the reservoir 43 without risk of separation between the elastic tube and the nipple.

The clamp 51 preferably is made of high-density polyethylene with other monomers to obtain a low modulus of elasticity, flexibility and environmental stress crack resistance. The clamp 51 is formed in the shape of a small segment of tubing, or a cuff, in which the inside diameter of the clamp equals the outside diameter of the elastic tube 40. The elastic tubing 40 is drawn over the annulus 50 to permit the annulus to effectively bite into the adjacent portion of the tubing 40 and thus seize the tubing with enough force to prevent the inflation of the tubing with irrigating fluid from dislodging the tubing from the nipple 41.

A different embodiment of an emitter valve 76 is shown in FIGS. 11 through 14, inclusive. As shown, for example, in FIG. 11, the emitter valve 76 has an inlet 77 to a diaphragm chamber 80. The chamber 80 has the approximate shape of an annular diffuser that contains a cone 81. The chamber 80 has, an illustrative embodiment, a clearance perpendicular to flow direction 82 of 0.16", reduced by the thickness of diaphragm 83 to a net gap of 0.125". The chamber 80 terminates in an annular diffuser 84 that establishes fluid communication with a discharge nozzle 85. Note that the longitudinal axis of the discharge nozzle 85 is parallel with an enjoys the same diameter as the inlet 77. In this manner, the emitter valve 76 has a low hydraulic resistance and a resistance to the destructive effects of freezing. Thus, the absence of bends, sudden expansion or contraction or sharp corners avoids boundary layer separation for the fluid 11 to further promote low hydraulic resistance.

Particular attention is invited to the nature of the diaphragm 83. As shown, the diaphragm 83 is thin, light, extremely flexible (without substantial stretching), with low wear, low superficial friction and a long cycling life, especially in the presence of aggressive chemicals. It has been found that a composite material serves this purpose best. Illustratively, a main body of polymeric elastomer with aramid fiber reinforcement is suitable for this purpose.

In accordance with several of the important features of this invention, note that irrigation emitter nozzle 88 is coterminous with and does not protrude beyond the body of the emitter valve 76. Thus, the emitter nozzle 88 is less likely to break when stepped upon by workers as they go about their tasks. The wall thickness, wall material elasticity and configuration of the emitter valve 76, moreover, are not subject to breakage as a consequence of the expansion of ice forming in the residual fluid in the valve 76 at the end of the growing season and with the beginning of cold weather.

Further, in this regard, the larger clearance in the emitter valve 76 makes this valve less likely to failure due to particulate matter clogging. The thin diaphragm 83 also provides a self-cleaning action that tends to scrub or to wipe from the sealing surfaces of the valve 76 particles that so often are entrained in irrigating water.

Consider FIG. 1 once more with respect to the elastic tubing 40 and a control tube 52 that establishes fluid communication between the reservoir 43 within the elastic tubing and a pilot valve 53. One of the salient features of this invention is the significant reduction in irrigating fluid loss during depressurization that is achieved through the operation of the pilot valve 53 and the pulser 13 during header depressurization. To a large extent this saving occurs because the irrigating fluid that is discharged during depressurization is limited to a small quantity of fluid from the header 12, in contrast to prior art systems that discharged large quantities of irrigating fluid directly to the atmosphere from their respective pilot valves. Consequently, the inside diameter of the control tube 52 should be the smallest possible diameter that is consistent with reduction of irrigating fluid waste to a minimum; use of a volume of water that does not significantly alter the uniformity of water distribution among the emitters in the longest irrigating line 33; and the unimpeded transmission of pressure waves with adequate intensity through the irrigating fluid in the control tube.

Figure 4:
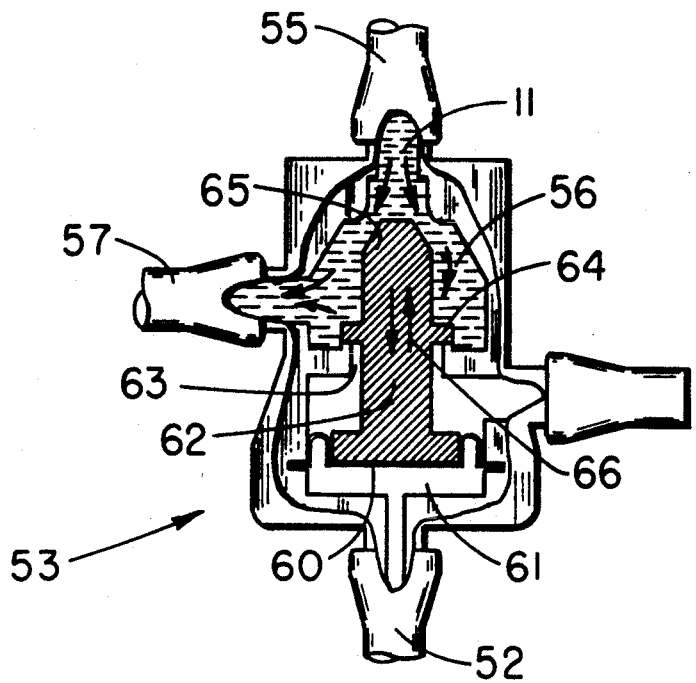
FIG. 4 is a schematic diagram of a pilot valve, in partial section, as shown in FIG. 1, and in the filling phase.

As shown in FIG. 1, the pilot valve 53 has a water supply inlet 54 that establishes fluid communication with the irrigating fluid 11 in the conduit 10 through a tube 55 to a pilot valve chamber 56. A further tube 57 provides fluid communication, selectively, between the pilot valve chamber 56 and the pulser diaphragm chamber 31. Perhaps, best shown in FIG. 4 is the pilot valve diaphragm 60 that separates a pilot valve diaphragm chamber 61 from the pilot valve chamber 56.

A pilot valve stem 62 is connected, on one end, to the side of the diaphragm 60 that is exposed to the pilot valve chamber 56. The stem 62 passes through an atmosphere discharge port 63 and has an annular atmosphere discharge port plug 64 that selectively blocks the flow of irrigating fluid 11 through the discharge port 63. The valve stem 62 terminates in a water supply inlet plug 65 that interrupts the flow of the irrigating fluid from supply, through the tube 55 into the chamber 56 in response to movement of the valve stem 62 in the direction of the arrows 66.

Figure 5:
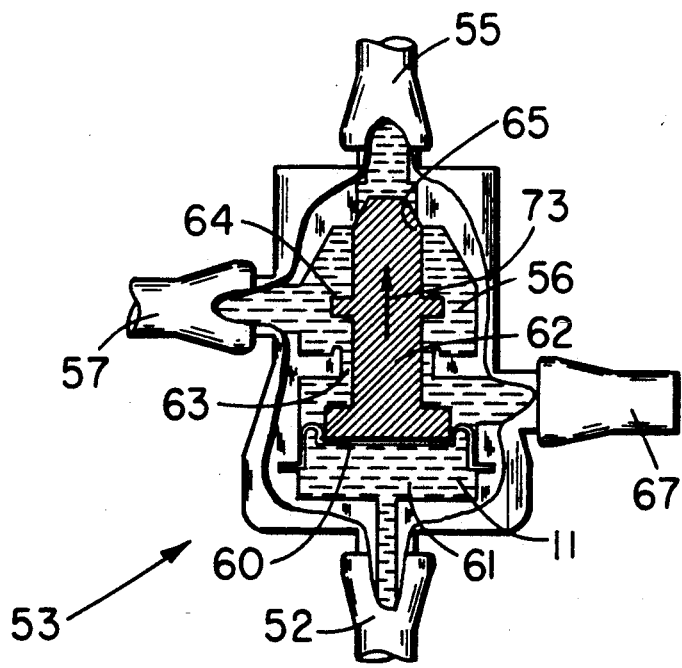
FIG. 5 is a schematic diagram of the pilot valve, in partial section, as shown in FIG. 4, but with the pilot valve in the discharge phase.

As best shown in FIG. 5, moreover, fluid communication is established between the pulser diaphragm chamber 31 (FIG. 1) and the atmosphere through the tube 57 (FIG. 5) by way of a path that includes the pilot valve chamber 56, the gap that is formed by the atmosphere discharge port 63, the valve stem 62, the atmosphere discharge port plug 64 and the pilot valve diaphragm 60, and an atmosphere discharge outlet 67.

Figure 15:
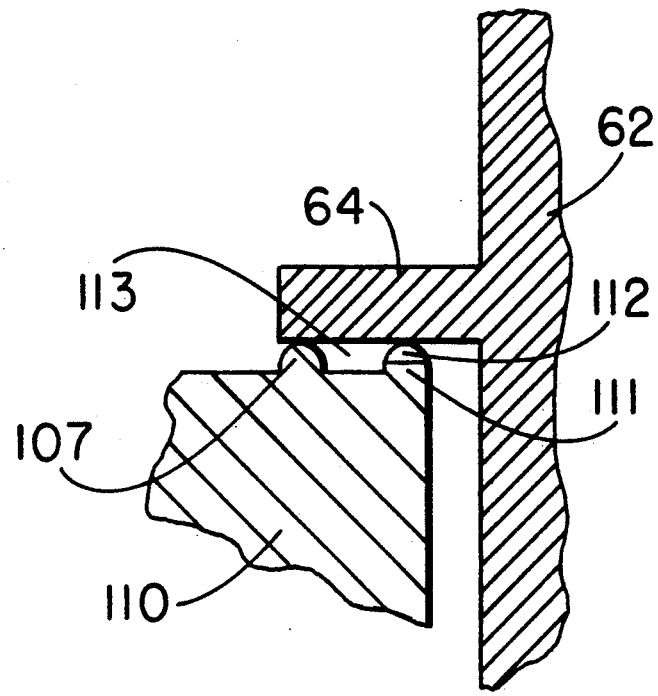
FIG. 15 is a view of a portion of the pilot valve in the filling phase.
Figure 16:
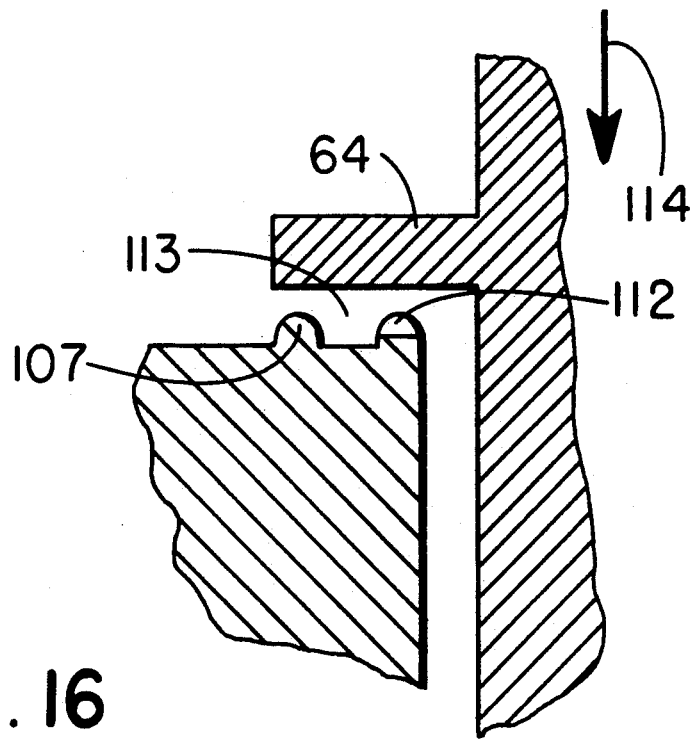
FIG. 16 is a view of a portion of the pilot valve in the discharge phase.

A salient feature of the pilot valve 53 is illustrated in FIGS. 15 and 16 Thus, to further reduce wasteful discharge of irrigating fluid to the atmosphere through the tube 67, the annular seat for the atmosphere discharge port plug 64 is provided with an outer concentric baffle 107 that is formed on an inwardly oriented flange 110 that is formed in the body of the pilot valve 53. The outer baffle protrudes in a direction that is oriented toward the oppositely disposed plug 64.

In accordance with a feature of this aspect of the invention, a concentric inner baffle 111 is disposed inwardly of the outer baffle 107 and also protrudes toward the opposing surface of the plug 64. Note also that a small passageway 112 is formed in the inner baffle 111 to permit controlled seepage from an annular chamber 113 that is formed between the concentric baffles 107 and 111.

In operation, the control tube 52 (FIG. 1) is coupled to the elastic tube 40 in the longest irrigating line 33 in the irrigating module. For simplified description and clarity in presentation, only one irrigating line, the line 33, is shown and described. Other irrigating lines (not shown) would not have as many emitter valves and associated elastic tubes as those which are coupled together to form the line 33. The control tube 52, moreover, is coupled to the elastic tube 40 between the emitter valve 36 and the next downstream emitter valve 70 to achieve the desired irrigation pulse repetition rate. As the control tube 52 is connected closer to the header 12, the irrigating pulse repetition rate becomes faster; as the control tube 52 is connected further away from the header 12 and closer to the end of the line 33, the pulse repetition rate becomes slower.

Figure 9:
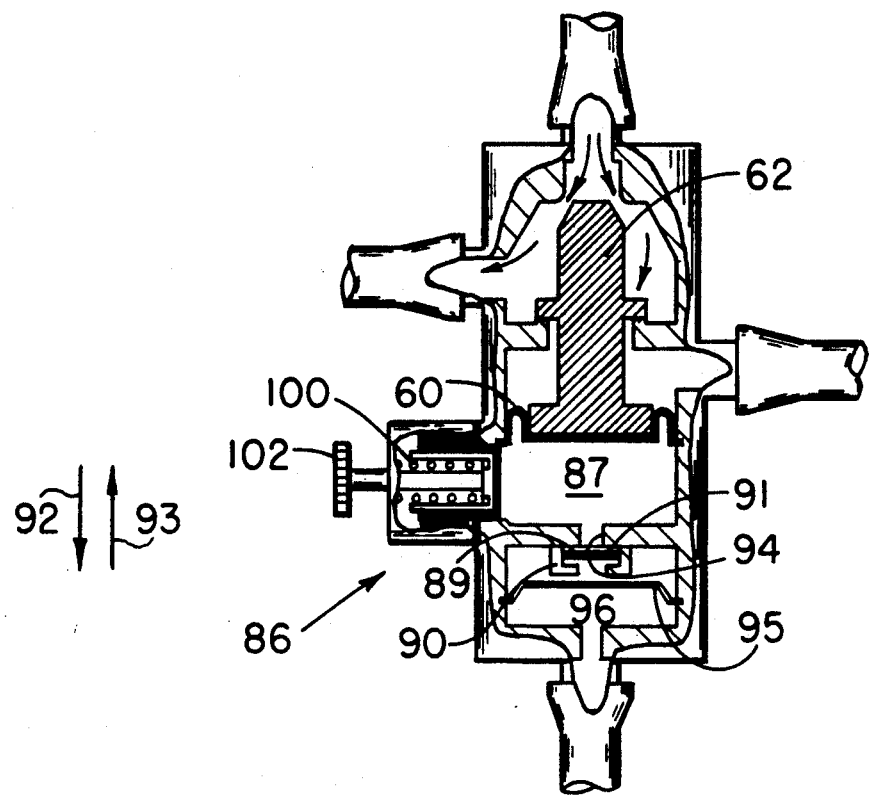
FIG. 9 is a schematic diagram of a pilot valve, in filling position, for use in the embodiment of the invention shown in FIG. 8.
Figure 10:
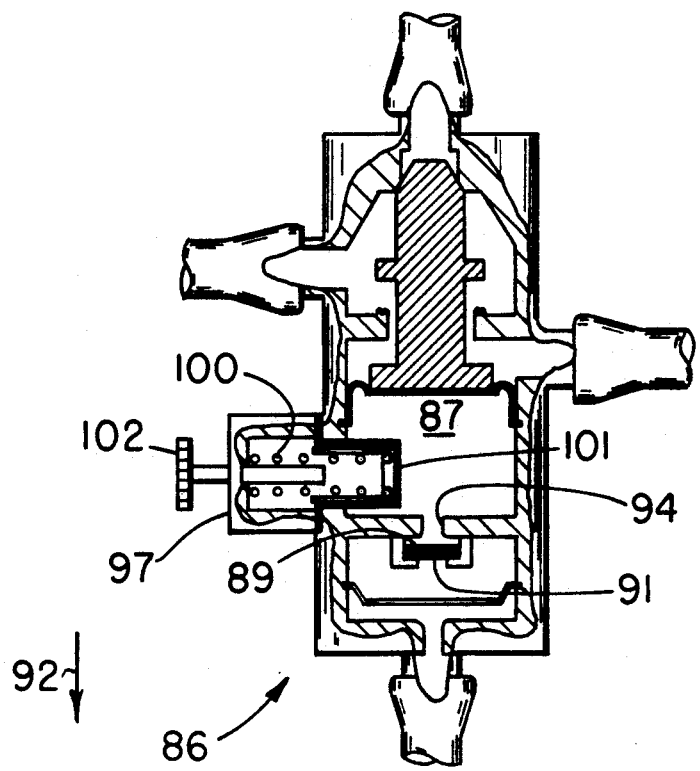
FIG. 10 is a schematic diagram of the pilot valve that is shown in FIG. 9, in discharge position.

An improved pilot valve 86 is shown in FIGS. 9 and 10. As illustrated, the pilot valve 86 is a three-way, two-position valve. In the open position, as shown in FIG. 9, the valve 86 supplies water and pressurizes the pulser diaphragm chamber 31 (FIG. 1) when the elastic tubes 37 and 40 are being filled. When the pilot valve 86 is closed, as shown in FIG. 10, the valve 86 depressurizes the pulser diaphragm chamber 31 (FIG. 1) in the pulser 13 to permit the emitter nozzles 35 and 36 to discharge irrigating fluid from the respective elastic tubes 37, 40 and irrigate the surrounding soil (not shown).

This switching or shifting between the two positions for the pilot valve 86, as shown in FIGS. 9 and 10, is achieved through changes in pressure in pilot valve chamber 87. This pressure control in the chamber 87 is provided through a fluid diode 90. As shown, the fluid diode has a flexible disc 91 that moves in the directions of arrows 92 and 93. A radially disposed groove 89 is formed in the side of the disc 91 that is exposed to the pilot valve chamber 87, thus permitting the disc 91 to seal a port 94, except for the area under the groove 89.

As shown, the port 94 provides fluid communication with the pilot valve chamber 87. During the filling phase, the pressure from the header 12 (FIG. 1) presses the disc 91 (FIG. 9) against the port 94 to seal the port, except for the area under the groove 89. The limited flow through the groove into the chamber 87 thereby establishes a high flow resistance and a large time constant for the transfer of fluid from under protective membrane 95 in pressurizing chamber 96 to the pilot valve chamber 87. The membrane 95 can be quite important. Not only does it transmit pressure fluctuations between the pressurizing chamber 96 and the pilot valve chamber 87, but it also protects the pilot valve chamber 87 from fouling through entrained particulate matter in the irrigation fluid that flow into the pressurizing chamber 96. The membrane 95 provides a further advantage over the pilot valve 53 shown in FIGS. 4 and 5. The pilot valve 53 must be purged of air before automatic system operation can commence. The membrane 95 in the pilot valve 86 (FIGS. 9 and 10), however, does not require burdensome air purging, or the like.

Illustratively, as the pressure in the chamber 87 increases, flexible pilot valve diaphragm 60 regulates the motion of the pilot valve stem 62 to move in the direction of the arrow 93, thus permitting the pilot valve 86 to function much in the same manner as the pilot valve 53 that is shown in FIGS. 1, 4 and 5.

The pilot valve 86, however, is quite different from the valve that characterizes FIGS. 4 and 5 in several other respects. For example, the fluid within the pilot valve chamber 87 is preferably, a liquid with a high boiling point, a low coefficient of thermal expansion and a low freezing point. Typically, ethylene glycol and water, glycerin and water and commercial anti-freezes are suitable for this purpose.

As best shown in FIG. 10, moreover, during irrigation fluid discharge, the higher pressure at the diode port 94 on the side of the pilot chamber 87 pushes the flexible disc 91 in the direction of the arrow 92. The flow through the radial groove 89 is at a high rate in a cycle of short duration. It should be noted that the same quantity of fluid flows through the diode 90 in both directions in the irrigation fluid filling and discharge phases, respectively, and that this volume corresponds to the change in the volume in the pilot valve chamber 87.

An additional feature of the improved pilot valve 86 that is shown in FIGS. 9 and 10, in contrast with the valve that is shown in FIGS. 1, 4 and 5, is a pilot valve elastic capacitance chamber 97. The purpose of the capacitance chamber is to provide a more convenient, more readily accessible means for regulating the irrigation cycle repetition rate than that which is described in connection with the positioning of the control tube 52 (FIG. 1) with respect to the length of the irrigating line 33.

As shown in FIG. 10, the capacitance chamber is a spring biased 100 rolling membrane 101, the force applied by the biasing spring 100 being controlled by the manipulation of a threaded handwheel 102 which determines, as best shown in FIG. 9, the volume within the pilot valve chamber 87 that the rolling membrane 101 will occupy or absorb when the biasing spring 100 is fully compressed in response to the higher pressure in the pilot valve chamber 87. Thus, by manipulating the handwheel 102 a wide range of elastic capacities are possible, in which each capacity value corresponds to an irrigating pulse frequency or repetition rate.

As the relative fluid pressures change within the pilot valve 86, there is a transitional period during which the relative pressure differences are quite small, hence leading to a slower valve action and a longer period of time during which irrigating fluid is being wastefully discharged to the atmosphere. To reduce this time, and to correspondingly reduce wasted irrigating fluid valve closing time is further shortened by means of the baffles 107 and 111 that are shown in FIGS. 15 and 16. The goal is to have the atmosphere discharge port plug 64 seat firmly and swiftly on the crest of the outer concentric baffle 107 in order to limit the volume of irrigating fluid that is discharged to the atmosphere to a small volume within the housing of the pilot valve 86.

In operation, as the plug 64 moves to seal off the atmospheric discharge, the plug 64 (FIG. 16) moves in the direction of arrow 114, closing the gap between the flange on the plug 64 and the outer concentric baffle 107. Seepage through the passageway 112 from the chamber 113 limits flow from the chamber 113 to the atmospheric discharge from the pilot valve 86, causing the plug to snap shut.

In a similar manner, and as best shown in FIG. 15, seepage through the passageway 112 into the chamber 113 increases the pressure within the chamber, thereby enabling the plug 64 to snap open. The principle underlying this opertion is a consequence of the larger flow area that is provided by the larger diameter of the outer concentric baffle 107 and the opposing surface of the flange on the plug 64 in contrast to the smaller flow area between the concentric inner baffle 111 and the opposite surface of the plug 64.

Figure 2:
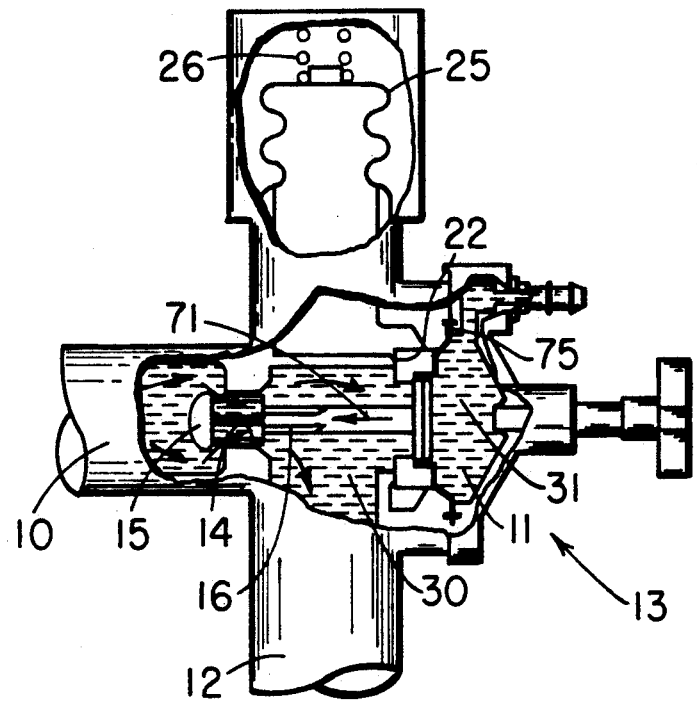
FIG. 2 is a schematic diagram, in partial section, of a pulser valve as shown in FIG. 1, and in the filling phase.

To fill the system, and as shown in FIG. 2, irrigation fluid 11 in the pulser diaphragm chamber 31 closes the discharge port 20 to block flow from the header 12 to the accumulator 23 and drives the valve stem 16 in the direction of arrow 71 in order to drive the inlet port plug 15 in a direction that opens the inlet port 14 to establish flow from the water supply conduit 10 through the header chamber 30 into the header 12. Turning once more to FIG. 1, the irrigating fluid from the header 12 flows through the rigid tube segment 34 and into the irrigating line 33 through a path that includes, illustratively, the elastic tube 37, the inlet passageway 42, the throat 44 of the emitter valve 36 and the reservoir 43 of the elastic tube 40, and so on throughout the line 33 until a last elastic tube 72 fills with the irrigating fluid 11 to essentially the same pressure as the fluid pressure in the header 12.

Upon equalization of the irrigating fluid pressure throughout the header 12, the line 33 and the control tube 52, the discharge phase of the irrigating pulse cycle commences.

As shown in FIG. 5, the pressurized irrigating fluid 11 in the control tube 52 and the pilot valve diaphragm chamber 61 drives the valve stem 62 in the direction of arrow 73. In this condition, the water supply inlet plug 65 blocks flow from the water supply through the tube 55 to the pulser diaphragm chamber by way of the tube 57. This movement of the valve stem 62 also opens the passageway from the pulser diaphragm chamber 31 (FIG. 1) through the atmosphere discharge port 63 (FIG. 5) to the atmosphere through the discharge outlet 67.

Figure 3:
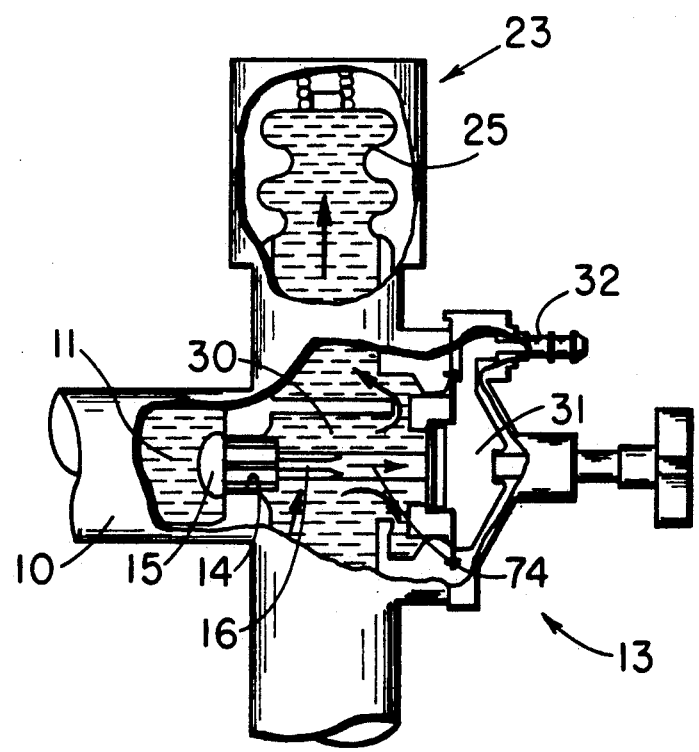
FIG. 3 is a schematic diagram, in partial section, of the pulser valve as shown in FIG. 2, but with the pulser valve in the discharge phase.

The effect of this discharge to the atmosphere through the pilot valve 53 results in a change in the status of the pulser 13 that is best shown in FIG. 3. Thus, the discharge in irrigating fluid from the pulser diaphragm chamber 31 through the control tube inlet 32 causes the valve stem 16 to move in the direction of arrow 74. This motion draws the inlet port plug 15 against the inlet port 14 thereby interrupting the flow of the irrigating fluid 11 from the conduit 10 to the header 12. This same motion of the valve stem 16 later opens the discharge port 22 to establish flow from the header 12 through the header chamber 30 and the now open discharge port 22 into the interior of the spring biased bellows 25. The additional fluid volume provided by the bellows 25 within the accumulator 23 reduces the pressure of the irrigating fluid in the header 12. When the impact of the fluid pressure wave from the header 11 changes the direction of the momentum of the pressure wave that causes the wave to reverse direction and flow out of the spring-loaded bellows 25 with the aid of the stored mechanical energy in the spring 26, the pressure wave now flows back into the header 12 in which the fluid now is at a lower pressure. By properly balancing the relationship between the spring 26, the bellows 25 and the range of pressure fluctuations within the header 12, a tuned, or resonant condition is established between the accumulator 23 and the header 12 that enables the emitter (not shown in FIGS. 2 and 3) in the respective lines with the associated reservoirs to discharge irrigating fluid sequentially.

In particular, once the irrigation system has been pressurized, a low-pressure traveling wave is generated at the beginning of the discharge phase by suddenly connecting the header 12 to the bellows 25 with flexible walls in the accumulator 23 that is initially at, or near, atmospheric pressure. In more detail, due to small resistance of the pulser 13 and the relatively large capacity of the accumulator 26, the pressurized water is accelerated sufficiently fast into the accumulator 23 to generate a traveling low-pressure wave in the header 12 having both the necessary wavelength and front sharpness to sequentially trigger the elastic tubes 37, 40 into the discharge phase.

Some blunting of the wave front will naturally occur as the wave travels past the junctions connecting the irrigating lines 33 to the header 12, and propagates into each line. The triggering of a line into discharge phase occurs when the low pressure wave reaches the first emitter valve 35 along the line 33, causing this emitter valve 35 to discharge to the atmosphere the pressurized water contained between the first and second emitter. The discharge process propagates sequentially along each line, as this process was described earlier.

As the water rushes from the header 12 into the accumulator 23 and expands it to its maximum volume, the pressure difference across the pulser 13 decreases, and, eventually, reverses direction. Indeed, while a waterhammer effect in the accumulator 23 helps the pressure there reach a value close to that present initially in the header 12, the pressure in the header 12 itself has decreased rapidly as water is fed into the irrigation lines 33 that have returned to atmospheric pressure following the onset of the discharge phase. Consequently, a condition exists where the header 12 is at low pressure and the accumulator 23 at high pressure, causing the reverse flow of the water back through the pulser 13 and into the header 12. In this way the accumulator 23 returns to a lower pressure, ready to begin the next cycle, i.e., closing the discharge port and opening the inlet port.

The physical properties and geometry of the header 12 are chosen to maximize the sound speed and minimize both the displacement of water and the distortion of the low pressure wave. Accordingly, the header material is rigid. The wall thickness and Young's modulus are substantially greater than those of the elastic tubing, and the geometry is circular with an optimum ratio of diameter to thickness.

The presence of air bubbles in water greatly decreases the water's bulk modulus, and, consequently, increases the mass flow required to produce a traveling wave with a specified pressure drop. Hence, to deal with the presence of air in the header 12, such as in the case after a prolonged shut-down, an accumulator 23 with an adequate expansion volume is required.

In lieu of an oversized accumulator 23, a spring-loaded relief valve can be installed between the discharge port and a normal accumulator (not shown).

The relief valve opens when the pressure exceeds a set pressure and it closes when the accumulator pressure drops below that setting. The set pressure assures enough depressurization for tripping the emitters along the lines.

During the initial cycles following a start-up, part of the air in the header 12 is transferred to the irrigating lines where it is discharged along with the irrigation water, while another port discharges through the relief valve. When most of the air has been removed, the bulk modulus of the water approaches the standard value, and the volume of the accumulator is sufficient to generate the low pressure wave, as described above, without relying on the assistance given by the relief valve.

The lower pressure in the header 12 causes the diaphragms 45 (FIG. 7) in the emitter valve 36 to shift, against the elastic force of the diaphragm, to a condition in which the diaphragm blocks the flow of the irrigating fluid 11 to the throat 44 and enables the irrigating fluid stored in the resorvoir 43, under the pressure of the elastic forces in the tube 40, to discharge through the emitter discharge passageway 47 to the soil that is to be irrigated by way of the emitter discharge nozzle 46.

As the elastic forces that are stored in the elastic tube 40 are depleted by expressing the irrigating fluid 11 from the reservoir 43, the fluid pressure within the control tube 52 (FIG. 4) also declines. Thus, the diaphragm 60 in the pilot valve 53, under a pressure that is lower than the irrigating fluid supply pressure, shifts the valve stem 62 in a direction that closes the path to the atmosphere from the pulser diaphragm chamber 31 (FIG. 1) through the tube 57 (FIG. 4). This movement also opens a path from the water supply through the tube 55 to the pulser diaphragm chamber by way of the pilot valve chamber 56 through the now opened water supply inlet plug 65.

The pulser 13 (FIG. 2) reacts to this change in the status of the pilot valve 53 by causing diaphragm 75 to close the discharge port 22 and the associated valve stem 16 then shifts in the direction of the arrow 71 and opens the inlet port 14 to reestablish fluid communication between the irrigating fluid supply in the conduit 10 and the header 12.

The flow of the irrigating fluid 11 into the header 12 in this filling phase enables the inherent resiliency of the diaphragm 45 (FIG. 6) to restore to the condition in which the diaphragm once more blocks the emitter discharge passageway 47 and allows the reservoir 43 to refill.

During system start-up, or to commence operation after a long shut down, the air entrapped in the header 12 is transferred to the reservoirs, of which the reservoir 43 is illustrative, where it is discharged with the irrigation water 11 to the atmosphere. For this purpose, a spring biased relief valve (not shown) can be installed between the discharge port 67 (FIG. 1) and the accumulator 24. Recalling that the accumulator 24 is an optional item in this system, if the system is not equipped with an accumulator, the relief valve mentioned above is not needed. The balance of the entrapped air in the header 12 then is discharged to the atmosphere through the relief valve. Thus, the relief valve opens when the pressure exceeds the pressure set through that valve's biasing and closes when the pressure in the accumulator 24 drops below the bias setting.

Figure 8:
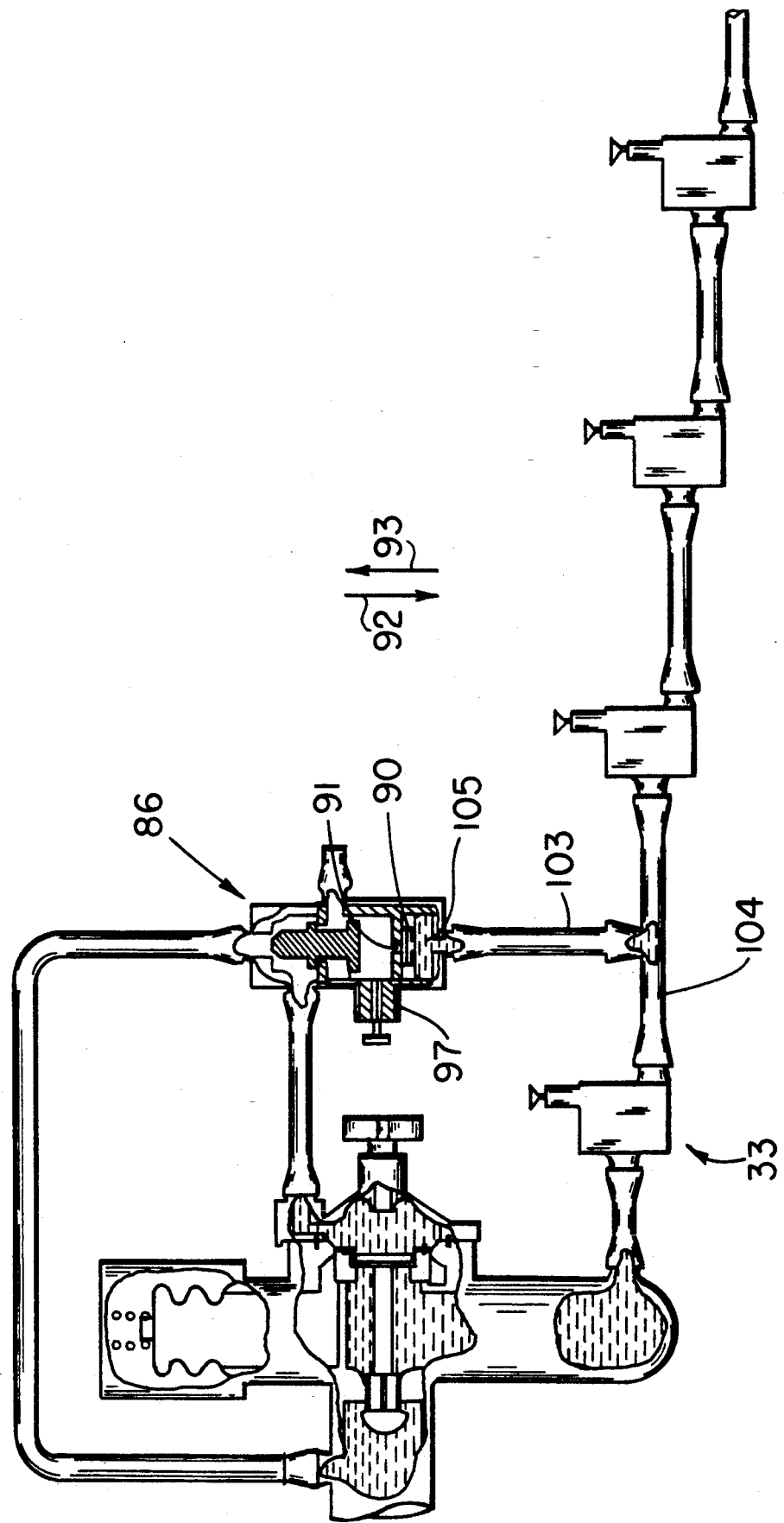
FIG. 8. is a schematic diagram of another embodiment of the invention.

A further and preferred embodiment of the invention is shown in FIG. 8. As shown in FIG. 8, the improved pilot valve 86 that is characterized by the fluid diode 90 and the manually controllable capacitance chamber 97 is substituted for the pilot valve 53 that is shown in FIG. 1. As seen in FIG. 8, a control tube 103 couples pressure fluctuation from an elastic irrigating fluid reservoir 104 to irrigating fluid side 105 of the fluid diode 90 in order to enable the flexible disc 91 in the diode 90 to shift in the direction of the arrows 92 and 93 in the manner described above.

Thus, in the preferred embodiment of the invention shown in FIG. 8, the control tube 103 only transmits pressure changes from the irrigating line 33 to the pilot valve 86, the capacitance chamber 97 being the means through which the irrigating pulse repetition rate is regulated.

Attention now is invited to FIGS. 11 through 14, which show a preferred embodiment of the emitter valve 76. Recall that the emitter valve 76 was described above. In operation, however, the motion of the diaphragm 83 is influenced primarily by the flow through the emitter 76. This flow produces a hydrodynamic force on the diaphragm 83 that, in addition to the friction, inertia and inherent resilience of the diaphragm and its surrounding structure produces movement of the diaphragm and operation of the emitter 76 that is subsequently described.

With no flow in the system the diaphragm shown in FIG. 11 is flat and unstressed, supported by four guiding stubs (not shown). As the elastic tube 104 (FIG. 8) fills with irrigating fluid the force of the incoming flow in the direction of the arrow 82 (FIG. 12) presses the diaphragm 83 against the emitter discharge passageway 106 to seal this passageway. In accordance with a feature of the invention the flexible, non-stretching nature of the diaphragm 83 causes the diaphragm to penetrate the passageway 106, thereby creating a greater unobstructed area for flow from the inlet to the elastic reservoir (not shown in FIG. 12) by way of the discharge nozzle 85. This penetration by the diaphragm 83 also produces a wiping, or scrubbing effect as it moves over the surrounding surfaces of the emitter 76, thereby providing an important self-cleansing effect.

When the elastic tube (not shown in FIG. 13) is filled, the hydraulic pressure in the discharge nozzle 85 and in the inlet 77 equalize, thereby permitting the resilient periphery to relax into the position shown in FIG. 13, with the central portion of the diaphragm still protruding into the emitter discharge passageway 106. Thus, flow of irrigating fluid from the emitter 76 continues to be blocked.

The next phase in the operation of the emitter 76, best shown in FIG. 14, occurs when the pressure in the inlet 77 becomes lower than the pressure in the discharge nozzle 85. In this cirumstance, the reverse flow from the elastic reservoir (not shown in FIG. 14) toward the water supply causes first the periphery of the diaphragm 83 to bend toward the inlet 77 and, eventually, to press the diaphragm against the structure that surrounds the inlet and form a seal. The diaphragm 83, in this manner, establishes fluid communication from the elastic reservoir (not shown in FIG. 14) through the discharge nozzle 85 and the diaphragm chamber 80 to the emitter discharge passageway 106. In this manner, the emitter valve 76 provides a much more efficient means of delivering irrigating fluid to the surrounding soil.

For application of the principles of the invention to smaller systems with one to six irrigation lines, it is possible to eliminate the accumulator 23 (FIG. 1) and the associated pulser 13. In this further embodiment of the invention, the tube 57 from the pilot valve 53 is connected directly to the header 12, the control tube 52 being connected to the irrigation line 33 as earlier described. Thus, irrigating fluid is supplied directly through the tube 55 to the pilot valve 53. The pilot valve 53, in turn, establishes a pulse repetition rate that is related to the place on the irrigation line 33 to which the control tube 52 is connected. Consequently, intermittent water flow is established between the tube 55, the chamber 56 of the pilot valve 53, the tube 57 and, directly, to the header 12 for distribution to the small array of irrigating lines, of which the line 33 is typical.

Similarly, the other embodiment of the pilot valve 86 that is shown in FIG. 8 also can be connected directly to the header 12 in the same manner as that described above with respect to the pilot valve 53.

Thus, there is provided an improved pulse irrigation system in which a more efficient and flexible apparatus is provided.

I claim:

1. A system for distributing irrigating fluid comprising a header, at least one irrigating line in fluid communication with said header, at least one emitter valve coupled to said header and said at least one irrigating line, at least one elastic tube in fluid communication with said at least one emitter valve, said at least one elastic tube providing a reservoir for the irrigating fluid and a means for discharging the irrigating fluid through said at least one emitter valve, an irrigating fluid conduit, a pulser for selectively coupling said conduit to said header, and a pilot valve in pressure communication with said reservoir of said at least one elastic tube and said pulser, exclusive of the irrigating fluid, to enable said pulser to establish fluid communication between said header and said conduit in response to said at least one elastic tube fluid.

2. A system for distributing irrigating fluid comprising a header, at least one irrigating line in fluid communication with said header, at least one emitter valve coupled to said header and said at least one irrigating line, at least one elastic tube in fluid communication with said at least one emitter valve, said at least one elastic tube providing a reservoir for the irrigating fluid and a means for discharging the irrigating fluid through said at least one emitter valve, an irrigating fluid conduit, a pulser for selectively coupling said conduit to said header, and a pilot valve in pressure communication with said reservoir of said at least one elastic tube and a pulser, exclusive of the irrigating fluid, to enable said pulser to establish fluid communication between said header and said conduit in response to said at least one elastic tube fluid and a control tube for coupling said at least one elastic tube irrigating pressure to said pilot valve.

3. A system for distributing irrigating fluid comprising a header, at least one irrigating line in fluid communication with said header, at least one emitter valve coupled to said header and said at least one irrigating line, at least one elastic tube in fluid communication with said at least one emitter valve, said at least one elastic tube providing a reservoir for the irrigating fluid and a means for discharging the irrigating fluid through said at least one emitter valve, an irrigating fluid conduit, a pulser for selectively coupling said conduit to said header, and a pilot valve in pressure communication with said reservoir of said at least one elastic tube and said pulser, exclusive of the irrigating fluid, to enable said pulser to establish fluid communication between said header and said conduit in response to said at least one elastic tube fluid and a housing for said pilot valve, a fluid diode within said pilot valve housing for regulating the time required for said pilot valve to activate said pulser, and an adjustable capacitance chamber in fluid communication with said pilot valve for regulating the activation frequency of said pulser.

4. A system for distributing irrigating fluid comprising a header, at least one irrigating line in fluid communication with said header, at least one emitter valve coupled to said header and said at least one irrigating line, at least one elastic tube in fluid communication with said at least one emitter valve, said at least one elastic tube providing a reservoir for the irrigating fluid and a means for discharging the irrigating fluid through said at least one emitter valve, an irrigating fluid conduit, a pulser for selectively coupling said conduit to said header, and a pilot valve in fluid pressure communication with said at least one elastic tube and said pulse to enable said pulser to establish fluid communication between said header and said conduit in response to said at least one elastic tube fluid, a fluid diode for regulating the time required for said pilot valve to activate said pulser, and a capacitance chamber for regulating the activation frequency of said pulser.

5. An irrigation system pilot valve comprising a housing having a pilot valve chamber formed therein, an irrigating fluid supply tube selectively communicating with said chamber, an atmospheric discharge tube selectively communicating with said chamber and a pulser control tube selectively communicating with said chamber, a pilot valve stem mounted for linear movement within said chamber, said valve stem having a water supply plug formed on one end thereof for establishing said selective communication between said fluid supply tube and said chamber, an atmospheric discharge port plug formed thereon for establishing said selective communication between said atmospheric discharge and said chamber, and a pilot valve diaphragm formed on said valve stem for linearly moving said valve stem to selectively establish communication from said chamber and said supply and discharge tubes, and a control tube for activating said pilot diaphragm and a fluid diode within said pilot valve for regulating said pilot valve diaphragm motion in response to said control tube pressure exclusive of said irrigating fluid.

6. A pilot valve according to claim 5 further comprising a spring-biased capacitance chamber for selectively regulating the volume of said pilot valve chamber in order to establish an irrigating fluid pulse discharge rate.

7. An emitter valve having a diaphragm chamber for an irrigation system comprising an irrigating fluid inlet for establishing fluid communication with said diaphragm chamber, a diaphragm mounted for translation between first and second positions in a gap within said diaphragm chamber of about 0.16" reduced by the thickness of said diaphragm chamber to a net gap of about 0.125" within the diaphragm chamber to control fluid flow therethrough, said diaphragm being flexible under the pressures of the irrigating fluid but maintaining diaphragm dimension when subjected to the irrigating fluid pressures, a cone spaced from said inlet and separated from said inlet by said diaphragm, an emitter nozzle formed on said cone, said emitter nozzle being coterminous with the emitter valve body, and a discharge nozzle in fluid communication with said diaphragm chamber, said discharge nozzle being parallel with said fluid inlet.

8. An emitter valve according to claim 7 further comprising at least one annular barb formed on said inlet, at least one annular barb formed on said discharge nozzle, an elastic tube having said at least one annular barb on said inlet lodged in the interior thereof, another elastic tube having said at least one annular barb on said discharge nozzle lodged in the interior thereof, a rigid tube segment having an inside diameter about equal to the outside diameter of said elastic tube on said inlet, said rigid tube segment pressing a portion of said elastic tube against said at least one annular barb on said inlet, and a rigid tube segment having an inside diameter about equal to the outside diameter of said elastic tube on said discharge nozzle, said rigid tube segment pressing a portion of said elastic tube against said at least one annular barb on said discharge nozzle.

9. A system for distributing irrigating fluid comprising a header, at least one irrigating line in fluid communication with said header, at least one emitter valve coupled to said header and said irrigating line, at least one elastic tube in fluid communication with said at least one emitter valve, said at least one elastic tube providing a reservoir for the irrigating fluid and a means for discharging the irrigating fluid through said at least one emitter valve, an irrigating fluid conduit, a pulser for selectively coupling said conduit to said header, and a pilot valve in fluid pressure communication with said reservoir of said at least one elastic tube and said pulser to enable said pulser to establish fluid communication between said header and said conduit in response to said at least one elastic tube fluid, and an accumulator in fluid communication with said pulser to store irrigating fluid discharged from said pulser when said pulser is activated and to enable said stored irrigating fluid to flow back into said pulser in response to activation by said pilot valve.

10. An irrigation pulser comprising a housing having formed therein a header chamber, an inlet port communicating with said header chamber and a discharge port also communication with said header chamber, a valve stem having an inlet port plug formed on one end thereof for selectively opening and closing said inlet port and a diaphragm formed at the other end of said valve stem for selectively opening and closing said discharge port, a control tube formed on said housing for pressure activation of said valve stem diaphragm in order to open and close said inlet and discharge ports in response to the pressure within said control tube and an accumulator bellows in selective fluid communication with said header chamber through said discharge port to temporarily store irrigation fluid therein, other end of the valve stem terminates in a piston, a valve plug circumscribing said piston in which said diaphragm establishes a fluid barrier for said piston and said plug to enable said piston and the valve stem associated therewith to move longitudinally and open said header port and to enable said plug to prevent irrigation fluid flow into said accumulator and to permit said piston to move in the other longitudinal direction to close said header port while flow to said accumulator is blocked and, after closing said header port to permit flow to said accumulator.

* * * * *